UNITED STATES PATENT OFFICE.

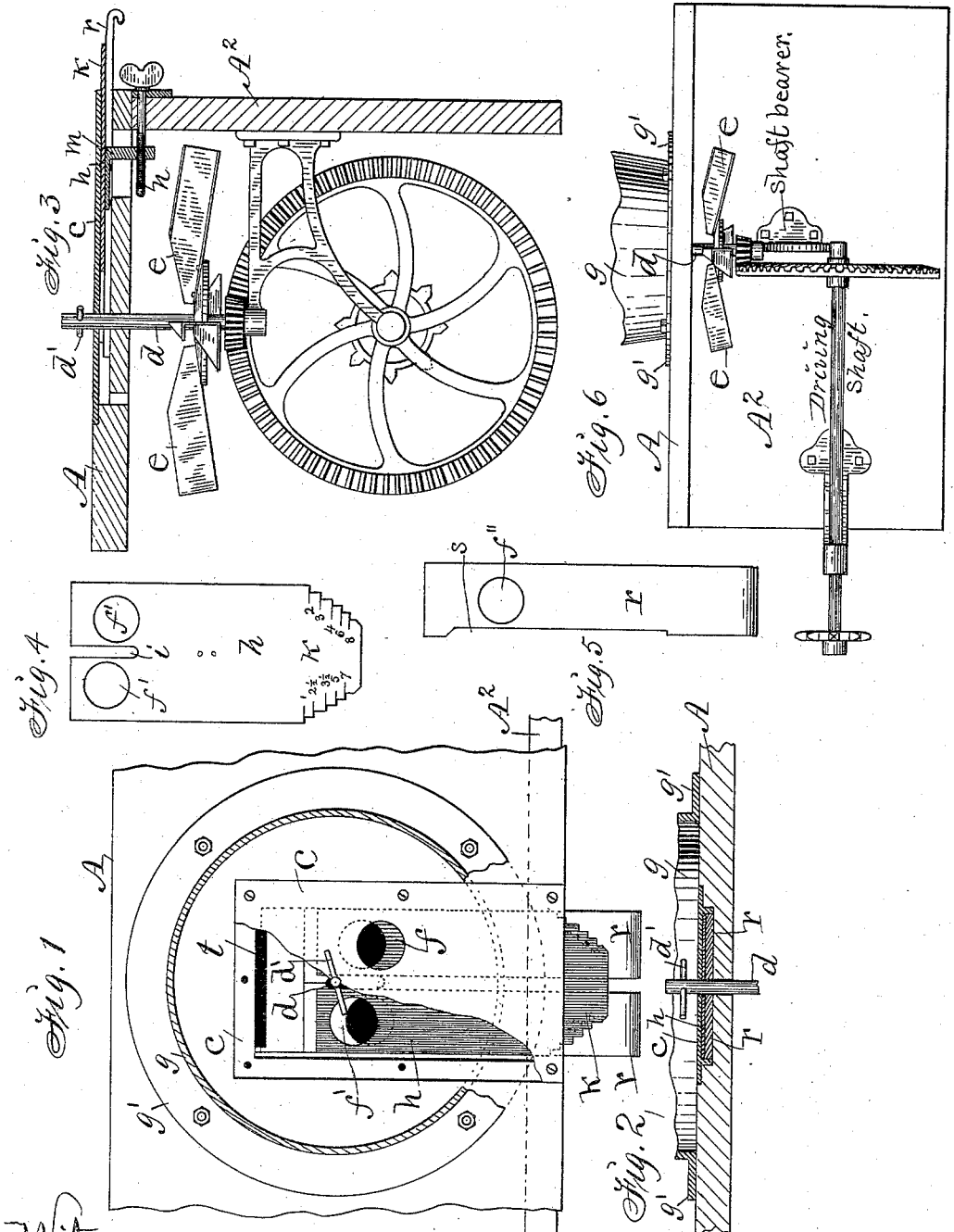

OSCAR F. HEARTWELL, JR., OF DES MOINES, IOWA, ASSIGNOR OF ONE-HALF TO ALFRED D. PLACE, OF SAME PLACE.

BROADCAST SEED-SOWER.

SPECIFICATION forming part of Letters Patent No. 319,411, dated June 2, 1885.

Application filed November 28, 1884. (No model.)

*To all whom it may concern:*

Be it known that I, OSCAR F. HEARTWELL, Jr., of Des Moines, in the county of Polk and State of Iowa, have invented an Improved Broadcast Seed-Sower, of which the following is a specification.

My invention relates to that class of seed-sowers that are designed to be attached to a farm-wagon and automatically operated by power transmitted from one of the wheels as the wagon is advanced over the prepared ground. Heretofore a hopper, a rotating shaft having a seed-stirrer at its top and radial arms for scattering seeds at its bottom, and a series of interchangeable sliding gages and cut-offs, have been combined with a base-board in such a manner that the complete device could be attached to a wagon for the purpose of sowing different kinds of seeds and different quantities to an acre of ground. My object is to dispense with the interchangeable sliding gages that have perforations varying in size and adapted to allow different kinds and different quantities of seeds to pass from the hopper, as required, to regulate the quantity of each kind distributed per acre; and I accomplish the results contemplated by forming and combining a single adjustable gage and graduated scale with a base-board, a hopper, a rotating shaft, and sliding cut-offs, as hereinafter fully set forth, in such a manner that the machine can be readily adjusted, by simply turning a thumb-screw, to adapt it to sow any kind of seed, and to regulate the quantity sown upon an acre.

Figure 1 of my accompanying drawings is a top view of a section of my machine, showing the vertical portion of the hopper removed. Fig. 2 is a sectional view through the line $x\,x$ of Fig. 1. Fig. 3 is a transverse section of Fig. 1. Fig. 4 is a top view of my adjustable gage. Fig. 5 is a top view of one of my sliding cut-offs. Fig. 6 is a perspective view of the machine.

Jointly considered, these figures clearly illustrate the construction and operation of my complete invention.

A represents the base-board, that is adapted to extend across the rear end of a wagon.

$A^2$ is a narrow board of corresponding length, fixed under the front edge of the base A, to extend downward at right angles.

$c$ is a metal plate of oblong form, fixed in a corresponding depression cut into the top surface of the base A, to extend from its front edge rearward.

$d$ is a vertical rotating shaft that extends above and below the base A and metal plate $c$, and is supported by bearers fixed to the base A.

$d'$ is a pin fixed to the top of the shaft $d$, to extend horizontally in opposite directions, and to stir seed in the hopper as the shaft rotates, and, as required, to prevent the valves from becoming clogged.

$e\,e$ represent a series of radial arms fixed to the same shaft at a point below the base A in such a manner that the seeds dropped from the seed valves or openings in the bottom of the hopper will fall upon the radial arms, to be broadcast therefrom by centrifugal force as the shaft is rotated at great speed by means of drive mechanism combined therewith and connected with one of the wagon-wheels.

$f\,f$ are openings, preferably circular and one and five-eighths of an inch in diameter, that extend through the plate $c$ and the base-board A, to allow seeds to pass from the hopper and drop upon the radial arms $e$.

$g$ is a hopper that is open at its top and bottom, and has a horizontal flange, $g'$, at its bottom, by means of which it is fastened upon the base A and over the plate $c$, and in a concentric position with the rotating shaft $d$, by means of screw-bolts.

$h$ is my adjustable gage, about four and a half $(4\frac{1}{2})$ inches wide and ten (10) inches long, cut from a metal plate by means of a suitable die and press. It has a longitudinal slot, $i$, at its rear end, adapting it to engage the shaft $d$ when inserted in a cavity of corresponding form and size cut out of the base A, underneath the plate $c$. It also has perforations $f'$, corresponding in shape and size with the perforations $f$ in the plate $c$.

$k$ is a graduated scale formed integral with the front end of the gage $h$ by forming series of corners in the edges of its sides in such a manner that each corner will be a distinctive and plainly-visible mark and guide for adjusting the gage relative to the plate $c$, for the purpose of bringing its perforations $f'$ in proper position relative to the perforations $f$ in the fixed plate c, as required, to partially close the perforations f, and to regulate the quantity of seed to be passed through the machine in a given time. When the first corner and mark "1" nearest the body of the gage h is even with the front edge of the plate c and base A, the perforations f and f' in the two plates will coincide, and the gage will be therefore set, as required, to operate the machine to its full capacity. By pushing the gage inward to bring other corners and marks on the scale k even with the front edge of the plate c, the openings f will be partially closed and the flow of seed restricted, as required, to diminish the quantity sown upon an acre.

m, clearly shown in Fig. 3, is an elbow-shaped iron fixed to the under side of the gage h.

n is a thumb-screw that extends through a bearing formed in or fixed to the board $A^2$, and through a female screw formed in the lower end of the elbow m in such a manner that the gage h can be readily moved longitudinally by simply turning the thumb-screw, and retained at any point desired by means of the same screw.

r, clearly shown in Fig. 5, is one of my sliding cut-offs, made of flat plate metal. It has a perforation, f'', corresponding with the perforations in the plate c and gage h, and an elongated notch, s, in its inside edge, through which the shaft d will extend in such a manner that it will serve as a bearing in directing the sliding movements of the cut-offs when two of them are placed in parallel position in a corresponding opening formed in the base A and immediately under the adjustable gage h. By simply pushing the plates r rearward, the openings f and f' in the plates c and h will be closed and the seed retained in the hopper. A reverse motion will open them.

t is a slot in the base A, under the rear portion of the plate c, that will allow seeds to drop that may be pushed rearward by the motion of the cut-offs r, and thereby prevent clogging.

When the openings or seed-valves f and f' are entirely open, the machine will sow three bushels and a peck of wheat to an acre, and four bushels and a peck of oats to an acre. When the gage h is set inward to the corner marked "2," these quantities will be diminished about one bushel per acre. When set into the corner marked "4," the machine will sow about one bushel of wheat, one of oats, and one and three-fourths of flaxseed to the acre. When the gage is set into the corner marked "7," it will sow about twelve quarts of timothy-seed, six quarts of clover-seed, six quarts of Hungarian grass seed, and four quarts of millet-seed to an acre.

It is obvious that the scale k, marked on the front end of the gage h, may vary to adapt it to regulate the flow of different kinds of seeds, so that any quantity desired to be sown upon an acre can be evenly broadcast over an acre by means of my machine by simply adjusting the gage h.

Instructions for adjusting the gage, as required, to sow different kinds of seeds and different quantities upon an acre may be stamped upon the gage, or printed and attached to the hopper, or given to the purchaser and user in any form or manner desired.

I am aware that interchangeable sliding plates have been used in a similar manner in a seed-sower; but my combination of a single adjustable plate or gage with a graduated scale and devices for adjusting and holding the plate relative to a fixed plate in the bottom of the hopper and a rotating vertical shaft is novel and greatly advantageous, in that it enables me to dispense with a series of interchangeable slides in sowing different kinds of seeds, and different quantities at different times, by simply adjusting the sliding gage relative to the graduated scale.

I claim as my invention—

1. In a broadcast seed-sower, an adjustable plate having a slot at its rear end and one or more perforations for the passage of seeds, in combination with a fixed and perforated plate in the bottom of a seed-hopper, a graduated scale, a rotating shaft having seed-distributers attached, and mechanism for adjusting the sliding plate, for the purposes set forth.

2. In a broadcast seed-sower, an adjustable gage-plate having perforations to allow seeds to pass through, and a graduated scale on its end to index and regulate the quantity of the seed passed through said perforations, in combination with the perforated bottom of a hopper or perforated fixed plate at the bottom of a hopper, for the purposes specified.

3. The gage-plate h, having a slot, i, perforations f', and a graduated scale, k, on its front end, the elbow-shaped bar m, and the screw n, in combination with the base A A, having a perforated plate, c, and a hopper, g g', fixed on its top surface, and a rotating vertical shaft having a series of radial arms, substantially as shown and described, to operate in the manner set forth, for the purposes specified.

4. The sliding cut-offs r, having perforations f'' and elongated notches s, in combination with the base A, the rotating shaft d, and a seed-hopper having a perforated bottom, substantially as and for the purposes set forth.

OSCAR F. HEARTWELL, JR.

Witnesses:
THOMAS G. ORWIG,
HUGH R. CREIGHTON.